Figure 1:
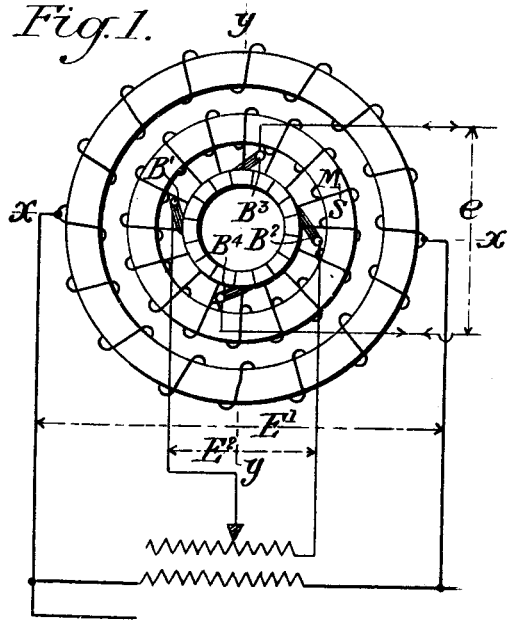

G. WINTER & F. EICHBERG.
O. WOLFRUM, ADMINISTRATOR OF G. WINTER, DEC'D.
DYNAMO ELECTRIC MACHINE.
APPLICATION FILED JAN. 9, 1912.

1,127,563.

Patented Feb. 9, 1915.

Witnesses.
Minerva Lobel
Agnes Hill

Inventors.
Gabriel Winter, deceased
(Otto Wolfrum, administrator)
& Friedrich Eichberg
By Pennie, Davis & Goldsborough
Attys

UNITED STATES PATENT OFFICE.

GABRIEL WINTER, DECEASED, BY OTTO WOLFRUM, ADMINISTRATOR, OF VIENNA, AUSTRIA-HUNGARY, AND FRIEDRICH EICHBERG, OF BERLIN, GERMANY.

DYNAMO-ELECTRIC MACHINE.

1,127,563. Specification of Letters Patent. Patented Feb. 9, 1915.

Original application filed June 11, 1902, Serial No. 111,180. Divided and this application filed January 9, 1912. Serial No. 670,163.

*To all whom it may concern:*

Be it known that OTTO WOLFRUM, residing at Vienna, Austria-Hungary, administrator of the estate of GABRIEL WINTER, deceased, whose certificate of authority is recorded at page 433 of liber S 90 of Transfers of Patents, and FRIEDRICH EICHBERG, a subject of the Emperor of Austria-Hungary, residing at Berlin, in the Empire of Germany, severally declare that the late GABRIEL WINTER and the said FRIEDRICH EICHBERG have invented certain new and useful Improvements in Dynamo-Electric Machines, of which the following is a specification.

In an application for United States Letters Patent No. 111,180, filed June 11, 1902, by the said Gabriel Winter and Friedrich Eichberg, and which has resulted in United States Letters Patent No. 1,016,866, of February 6, 1912, there is described an alternating current motor of the commutator type in which the two members of the motor are provided with primary and secondary windings, respectively, arranged to produce a single magnetization along a fixed line constituting the working axis, and there is added to the primary and secondary windings a third winding so arranged that the current in it produces a magnetic field having an axis which makes an angle with and is preferably 90 electrical degrees from the said working axis. In that application it is pointed out that any desired speed within practicable limits can be provided by making variations in the difference between the potential supplied to the primary winding and the potential supplied to the secondary winding, and it is further pointed out that the speed is also dependent upon the strength and phase of the magnetic field produced by the third winding, and that consequently by variation of these magnitudes a regulation can be produced. As disclosed in that application the third, or exciting, winding took in some cases the form of a rotor winding combined with the working rotor winding; and it was pointed out that such combined rotor winding might be supplied with one set of brushes approximately in line with the primary field to form a path for the currents induced in the rotor by that field, which brushes might be short-circuited; and with a second set of brushes displaced approximately 90 electrical degrees from the first and forming the path for the exciting current of the machine. The claims of that application are directed particularly to the manner of regulation which consists in varying the relative magnitudes of the voltages applied to the primary and the secondary windings.

The object of the present application is to cover the manner of regulation which resides in varying the magnetic field produced by the third, or exciting, winding to vary the speed; whether such regulation is alone relied upon for the speed variation desired, or is made use of in connection with variation of the relative magnitudes of the voltages applied to the primary and the secondary windings; to cover more specifically the form of such a machine in which the exciting winding is combined with the rotor winding; and to still further cover the form of machine in which the rotor winding is short-circuited along approximately the line of the primary field.

For the purpose of completely disclosing the invention to those skilled in the art it will suffice to describe it as applied to three typical forms of machines illustrated in the aforesaid application in Figures 4, 8 and 13 thereof.

Figure 2:
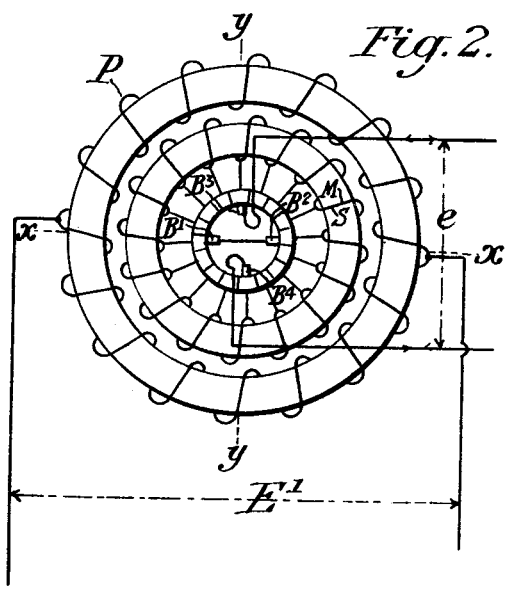

In the drawings of the present application, Fig. 1 corresponds to Fig. 4 of the said original application and shows a motor of the type referred to in which the exciting winding is on the rotor and is combined with the working rotor winding, means being provided for varying the potential applied to the secondary terminals as well as for applying a variable voltage to the terminals of the exciting winding. Fig. 2 corresponds to Fig. 8 of the said original application and shows an arrangement in which, as in Fig. 1, the rotor has a single winding connected to a many-part commutator and constituting both the secondary working winding and the exciting winding, but in this case the said winding is short-circuited on approximately the line of the primary field, so that variation of the exciting field is alone relied upon for varying the speed.

In the example shown in Fig. 1, the primary winding P is on the stator, and the rotor carries the secondary winding S and the exciting winding M, which is combined with S to form a single rotor winding connected to the segments of a many-part commutator. The brushes B' B² on the line x x are arranged to have impressed upon them a variable counter-electromotive force E² whereas the constant electromotive force E' is impressed on the terminals of the winding P, which are also on the line x x. The exciting winding M has a potential e impressed upon its terminals from an external source, and this is effected by means of the brushes B³ B⁴ bearing on the commutator on the axis y y, that is, substantially 90 electrical degrees from the axis x x. It will be observed that, as pointed out in the said original application, the alternating potential E' impressed upon the primary winding will, since that winding is a working winding, set up therein an alternating current which will be substantially in phase with the impressed electromotive force. At the same time there will be introduced into the secondary winding S by induction an alternating electromotive force corresponding in value to the ratio of transformation between P and S and opposite in phase to the primary electromotive force. These two windings together have the effect to create along the working axis x x an alternating magnetic field the phase of which will be substantially 90° behind the current in P and 90° ahead of the current in S. By means of the brushes B' B² which rest substantially on the axis x x of the machine, a variable counter-electromotive force E² may be impressed upon the secondary winding and the speed of the machine thus varied. As explained in said original application, the conditions of maximum torque are that the magnetic field of the winding M shall be in phase with the working current of the rotor, and since the winding M is an exciting winding this means that the electromotive force applied to its terminals should be substantially 90° out of phase with the electromotive forces impressed upon the windings P and S. The speed is also dependent upon the strength and phase of the magnetic field produced by the winding M and consequently, by variation of either or both of these magnitudes, a speed regulation can also be produced. The most convenient way of accomplishing this result is to vary the current in the winding M as suggested in said original application, though other ways of effecting such variation were within the knowledge of those skilled in the art as it existed at the time of filing said application and are within the scope of the appended claims. The desired current variation may evidently be effected by varying the potential e impressed at the terminals of the winding M.

In the case of Fig. 2, the primary winding P is on the stator, and the combined winding S and M on the rotor, as in Fig. 1, but in this case the brushes B' B² are short-circuited, so that the speed regulation is attained by varying the potential applied to the brushes B³ B⁴ of the exciting winding M. As pointed out in the said original application, a machine of this kind, having the secondary brushes short-circuited, will speed up until the counter-electromotive force induced in the secondary winding by rotation in the field of the winding M and the internal losses balance the impressed electromotive force. The result is that a variation of the field of winding M will give a variation of speed quite comparable to the effect of varying the field strength in a direct-current shunt-wound motor.

Machines constructed in accordance with the invention can be used as generators, because upon excitation through the magnetic field of any given strength an electromotive force must in all cases arise at the rotating armature, and this electromotive force, quite independently of the number of revolutions of the rotor, is equal in phase and periodicity with the magnetic field, and variations in the strength of this field will result in corresponding variations of the generated electromotive force.

The figures illustrate bipolar arrangements merely by way of example. For an apparatus having a greater number of poles the magnetic axes x x and y y are, generally stated, inclined to one another at an angle of 90° divided by half the number of poles, or 90 electrical degrees.

The windings on the stator are herein shown as ring windings, but it must be understood that all known and suitable open or closed windings can be used. The windings on the rotor are shown also as ring windings but all suitable closed windings such as are used for continuous currents and with segmental commutators can be used.

In the present application no broad claim is presented for an arrangement in which the magnetizing winding on the rotor is supplied with current through appropriate brushes, while the brushes of the rotor working winding are short-circuited, because that arrangement is broadly claimed in the applicants' co-pending application, Ser. No. 670,161, filed Jan. 9th, 1912; nor are any claims presented for the idea of controlling the speed by utilizing the combined effects of field variation and variation of the working current, because that idea is claimed in the applicants' co-pending application, Ser. No. 670,164, filed January 9th, 1912.

What we claim is:—

1. An alternating current machine of the commutator type having brushes and connections therefor coöperating to form for each pair of primary poles first, a path along approximately the line of the primary field for the currents induced in the rotor, and second, a path at an angle to the first for the exciting current of the machine, in combination with means for impressing a variable voltage on the second path.

2. An alternating current machine of the commutator type having brushes and connections therefor coöperating to form for each pair of primary poles first, a path along approximately the line of the primary field for the currents induced in the rotor, and second, a path at an angle to the first for the exciting current of the machine, in combination with means for impressing on the second path a variable voltage of such phase that the current resulting therefrom produces a magnetic field substantially in phase with the current of the first path.

3. An alternating current machine of the commutator type having brushes and connections therefor coöperating to form for each pair of primary poles first, a path along approximately the line of the primary field for the currents induced in the rotor, and second a path at an angle to the first for the exciting current of the machine, in combination with means for varying the current in the second path.

4. An alternating current machine of the commutator type having brushes and connections therefor coöperating to form for each pair of primary poles first, a path along approximately the line of the primary field for the currents induced in the rotor, and second, a path at an angle to the first for the exciting current of the machine, in combination with means for varying the ampere turns of the second path.

5. An alternating current machine of the commutator type having brushes and connections thereof coöperating to form for each pair of primary poles first, a short-circuiting path along approximately the line of the primary field for the currents induced in the rotor, and second, a path at an angle to the first for the exciting current of the machine, in combination with means for impressing a variable voltage on the second path.

6. An alternating current machine of the commutator type having brushes and connections therefor coöperating to form for each pair of primary poles first, a short-circuiting path along approximately the line of the primary field for the currents induced in the rotor and second, a path at an angle to the first for the exciting current of the machine, in combination with means for impressing on the second path a variable voltage of such phase that the current resulting therefrom produces a magnetic field substantially in phase with the current of the first path.

7. An alternating current machine of the commutator type having brushes and connections therefor coöperating to form for each pair of primary poles, first, a short-circuiting path along approximately the line of the primary field for the currents induced in the rotor and second, a path at an angle to the first for the exciting current of the machine, in combination with means for varying the current in the second path.

8. An alternating current machine of the commutator type having brushes and connections therefor coöperating to form for each pair of primary poles first, a short-circuiting path along approximately the line of the primary field for the currents induced in the rotor, and second, a path at an angle to the first for the exciting current of the machine, in combination with means for varying the ampere turns of the second path.

9. An alternating current machine of the commutator type having a system of brushes and connection therefor coöperating to form for each pair of primary poles a path along approximately the line of the primary field for currents induced in the rotor, and a second system of brushes at an angle to the first, in combination with an outside source of variable voltage and connections for feeding current from said source to the second system of brushes.

10. An alternating current machine of the commutator type having a system of brushes and connection therefor coöperating to form for each pair of primary poles a path along approximately the line of the primary field for currents induced in the rotor, and a second system of brushes at an angle to the first, in combination with an outside source of variable voltage and connections for feeding current from said source to the second system of brushes, the phase of the current of said outside source being such as to produce in the rotor a torque-producing field substantially in phase with the current flowing in the first system of brushes.

11. An alternating current machine of the commutator type having a single rotor winding, one system of brushes connected together to close a path for the currents induced in the rotor winding along approximately the line of the primary field, and a second set of brushes at an angle to the first, in combination with an outside source of variable voltage and connections for feeding current from said source to the second set of brushes to generate the torque-producing field of the machine.

12. An alternating current machine of the commutator type having a single rotor winding, one system of brushes connected together to close a path for the currents induced in the rotor winding along approximately the line of the primary field, and a second set of brushes at an angle to the first, in combination with an outside source of variable voltage and connections for feeding current from said source to the second set of brushes to generate the torque-producing field of the machine, the phase of the current of said outside source being such as to produce in the armature a torque-producing field substantially in phase with the current flowing in the first system of brushes.

13. An alternating current machine of the commutator type having a single rotor winding, one system of short-circuited brushes forming a path for the currents induced in the rotor winding along approximately the line of the primary field, and a second set of brushes at an angle to the first, in combination with an outside source of variable voltage and connections for feeding the variable current from said source to the second set of brushes to generate the torque-producing field of the machine.

14. An alternating current machine of the commutator type having a single rotor winding, one system of short-circuited brushes forming a path for the currents induced in the rotor winding along approximately the line of the primary field, and a second set of brushes at an angle to the first, in combination with an outside source of variable voltage and connections for feeding current from said source to the second set of brushes to generate the torque-producing field of the machine, the phase of the current of said outside source being such as to produce in the armature a torque-producing field substantially in phase with the current flowing in the first system of brushes.

15. A single phase motor of the commutator type, having two systems of brushes, the said brushes coöperating to form for each pair of primary poles, first, a path for the currents induced in the armature, and second, means for feeding variable magnetizing current from outside for generating the torque-producing field of the motor.

16. A single phase motor of the commutator type having two systems of brushes, the said brushes coöperating to form for each pair of primary poles, first, a path along the line of the primary field for the currents induced in the armature, and second, means for feeding from outside a variable magnetizing current approximately in phase with said induced current or with the current in the stator winding for generating the torque-producing field of the motor.

17. In a single phase machine, a primary member adapted for connection to a single phase source, a secondary member having a distributed winding connected at intervals to the segments of a many-part commutator, a set of brushes short-circuiting the secondary winding on a line substantially parallel to the line of primary magnetization, and another set of brushes displaced substantially 90 electrical degrees from the first set of brushes, in combination with connections for supplying current to the second set of brushes, and means for varying the ampere turns of the circuit of said second set of brushes.

18. In a single phase machine, a primary member adapted for connection to a single phase source, a secondary member having a distributed winding connected at intervals to the segments of a many-part commutator, a set of brushes short-circuiting the secondary winding on a line substantially parallel to the line of primary magnetization, and another set of brushes displaced substantially 90 electrical degrees from the first set of brushes, in combination with means for supplying to the second set of brushes a current of such phase as to produce in the armature a torque-producing field substantially in phase with the current flowing in the first set of brushes, and means for varying the ampere turns of the circuit of the second set of brushes.

In testimony whereof we affix our signatures in the presence of two witnesses.

OTTO WOLFRUM,
*Administrator of the estate of Gabriel Winter, deceased.*
FRIEDRICH EICHBERG.

Witnesses to the signature of Otto Wolfrum:
AUGUST FUGGER,
ADA MARIA BERGER.

Witnesses to the signature of Friedrich Eichberg:
IWAN DÖRN,
LEOPOLD JANISCH.

Copies of this patent may be obtained for five cents each, by addressing the "Commissioner of Patents, Washington, D. C."